United States Patent [19]

Johary et al.

[11] Patent Number: 5,222,212
[45] Date of Patent: Jun. 22, 1993

[54] FAKEOUT METHOD AND CIRCUITRY FOR DISPLAYS

[75] Inventors: Arun Johary; Tetsuji Oguchi, both of San Jose, Calif.

[73] Assignee: Chips and Technologies, Inc., San Jose, Calif.

[21] Appl. No.: 614,056

[22] Filed: Nov. 13, 1990

Related U.S. Application Data

[63] Continuation of Ser. No. 245,874, Sep. 16, 1988, abandoned.

[51] Int. Cl.⁵ .................... G06F 15/40; G09G 3/28
[52] U.S. Cl. ............................ 395/162; 395/153; 395/154; 340/717; 340/771
[58] Field of Search ... 364/200 MS File, 900 MS File, 364/518, 521, 522; 340/758, 785, 771, 716, 717; 395/162, 153, 154

[56] References Cited

U.S. PATENT DOCUMENTS

| | | | |
|---|---|---|---|
| 3,590,156 | 6/1968 | Easton | 178/7.5 D |
| 3,845,243 | 10/1974 | Schmersal et al. | 178/73 D |
| 3,863,023 | 1/1975 | Schmersal et al. | 178/6 |
| 4,121,283 | 10/1978 | Walker | 364/200 |
| 4,323,891 | 4/1982 | Akashi | 340/709 |
| 4,338,597 | 7/1982 | Steiner et al. | 340/706 |
| 4,399,435 | 8/1983 | Urabe | 340/750 |
| 4,563,676 | 1/1986 | Leininger | 340/749 |
| 4,563,746 | 1/1986 | Yoshida et al. | 364/492 |
| 4,626,837 | 12/1986 | Priestly | 340/723 |
| 4,657,146 | 3/1987 | Lucash et al. | 340/721 |
| 4,677,570 | 6/1987 | Taki | 340/717 X |
| 4,684,935 | 8/1987 | Fujisaku et al. | 340/717 |
| 4,688,031 | 8/1987 | Haggerty | 340/793 |
| 4,703,318 | 10/1987 | Haggerty | 346/723 |
| 4,739,313 | 4/1988 | Oudshoorn et al. | 340/703 |
| 4,742,346 | 5/1988 | Gillette et al. | 340/793 |
| 4,746,981 | 5/1988 | Nadan et al. | 358/160 |
| 4,760,387 | 7/1988 | Ishii et al. | 340/716 |
| 4,803,683 | 2/1989 | Mori et al. | 371/19 |

FOREIGN PATENT DOCUMENTS 0295692 12/1988 European Pat. Off. ............ 340/758
2085257 9/1984 United Kingdom .

*Primary Examiner*—Phu K. Nguyen
*Attorney, Agent, or Firm*—Townsend and Townsend Khourie and Crew

[57] ABSTRACT

A video display controller capable of providing video control information for either a flat panel or a CRT display. The controller includes a plurality of main circuits, alternate circuits, select circuits, and a circuit for identifying the display device used in the system. Each main circuit receives information from the processor and generates main video information compatible with a CRT. Each alternate circuit receives information from the processor and generates alternate video information compatible with a flat panel display. Each select circuit receives main and alternate video information and outputs main video information when the display device is a CRT display and the alternate video information when the display device is a flat panel display. In one embodiment, the alternate circuits are programmable registers. In another embodiment, tables are used to program the alternate registers to provide compatibility for a number of possible display devices.

9 Claims, 3 Drawing Sheets

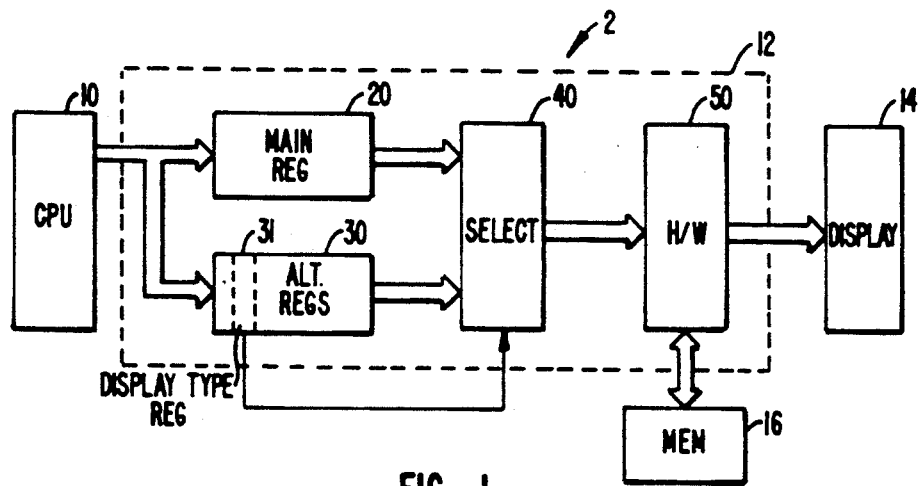
FIG._1.
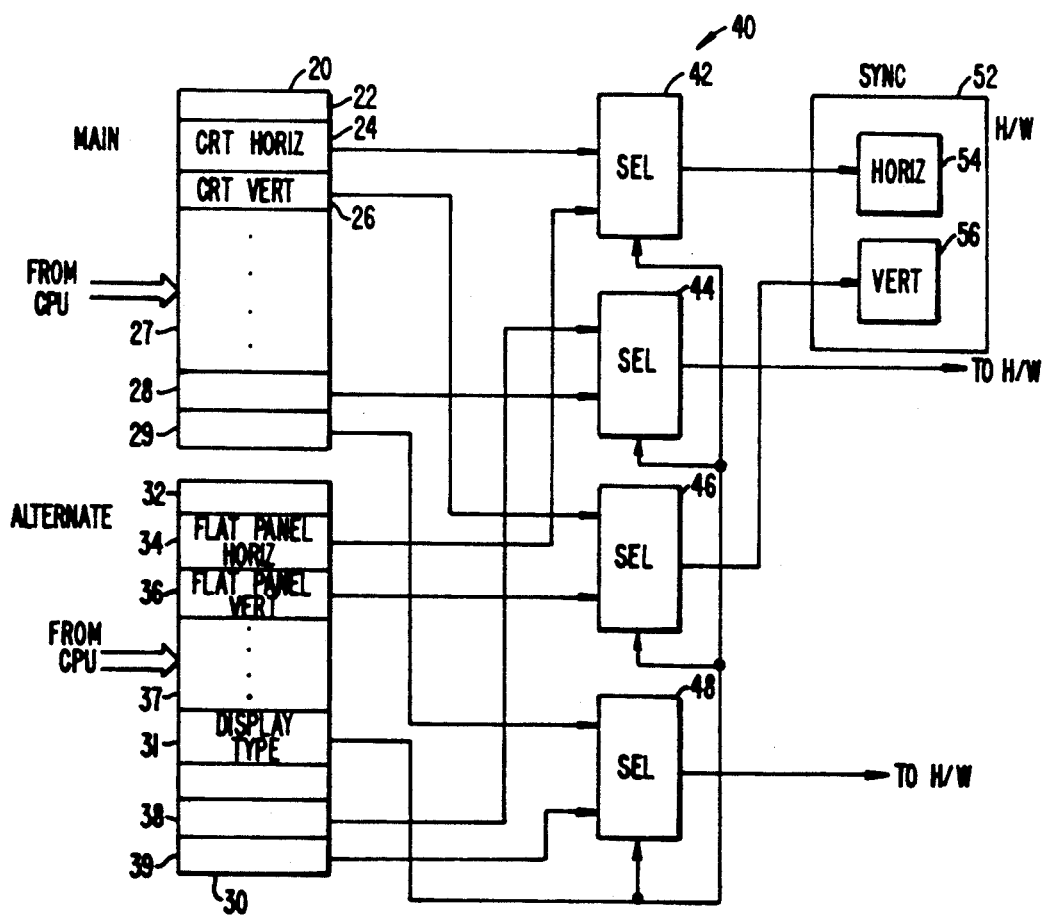
FIG._2A.

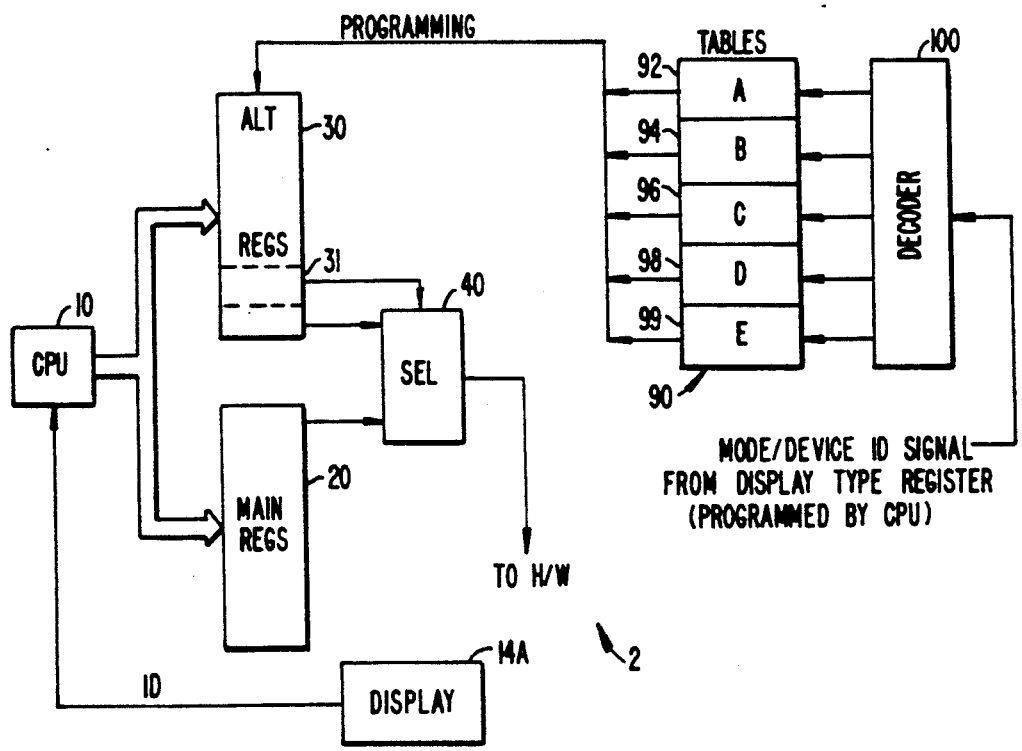
FIG._4.
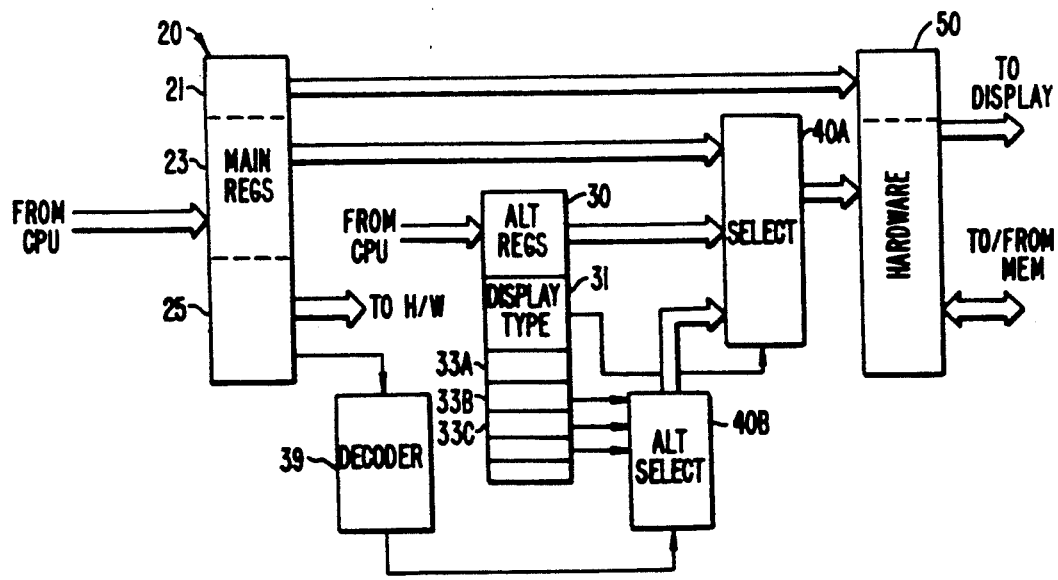
FIG._2B.

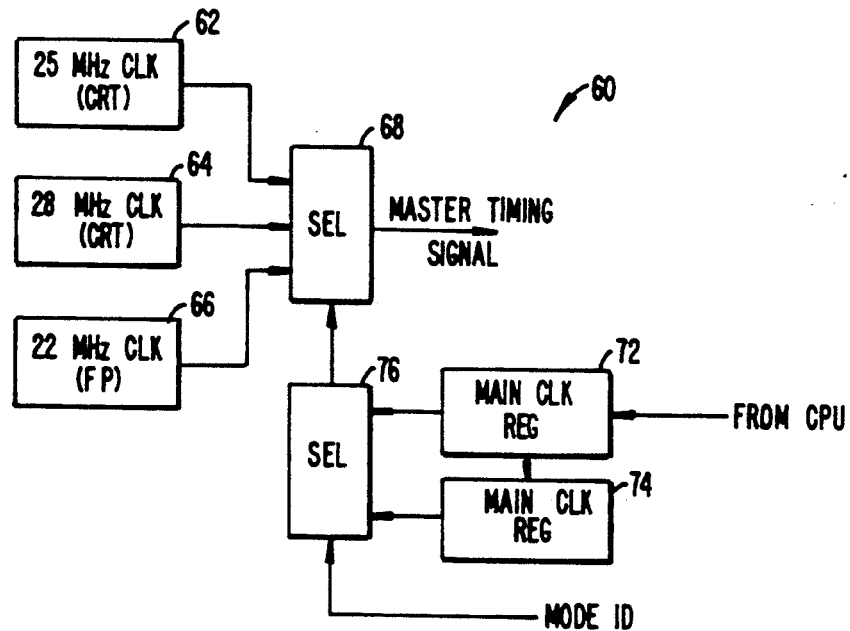
FIG._3.
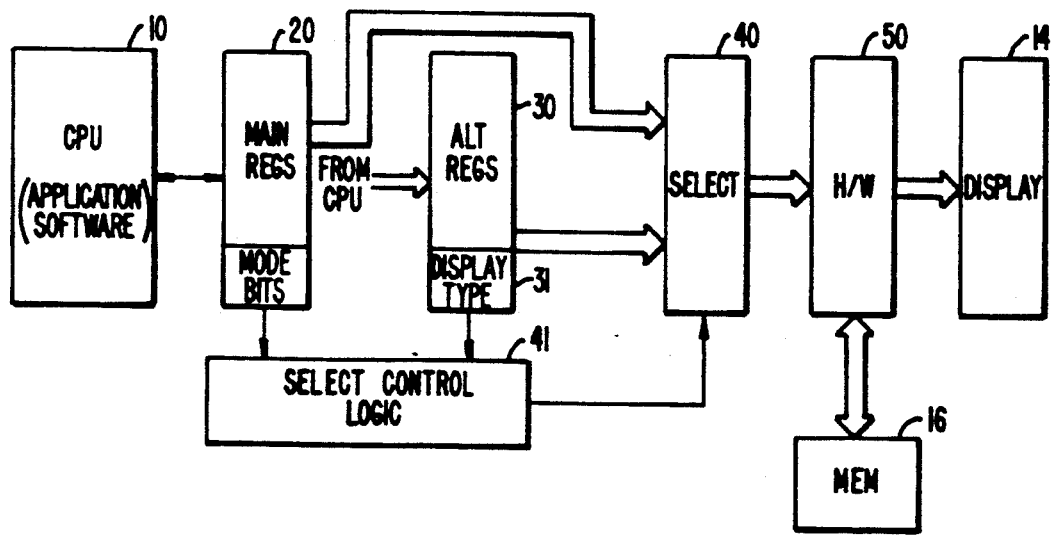
FIG._5.

FAKEOUT METHOD AND CIRCUITRY FOR DISPLAYS

This is a continuation of application Ser. No. 07/245,874, filed Sep. 16, 1988, now abandoned.

The invention relates to a video graphics controller for a personal computing system. More particularly, the invention selects between main video information and alternate video information to provide video control information compatible with either a CRT or a flat panel display.

BACKGROUND OF THE INVENTION

The typical personal computing system employs a central processing unit, a video controller, and a video display device. The central processing unit provides address, data, and clock information to the video controller which interacts with the system memory and ultimately controls the images displayed in the video display device.

Traditionally, personal computing systems have used cathode ray tube (CRT) type display devices. More recently, however, many manufacturers and vendors have employed flat panel display devices. Among other advantages, a flat panel display can be fabricated thinner and more compactly than can a CRT display.

On the other hand, a flat panel display has a slower response time than a CRT display because it is a chemically operative system. This difference in response time requires differences in timing, sync, horizontal, vertical, and other display control functions for the two types of devices. These control differences in turn necessitate different hardware and circuitry in the controllers used with a flat panel display as compared to a controller used with a CRT. Presently, most commercially available processors and graphics controllers are designed to interface with only a CRT, or possibly a flat panel display, but not both.

In order to keep down costs and proliferation of models, manufacturers of processing systems and controllers prefer not to design a different processor and video controller merely because a flat panel display will be used in a processing system rather than a CRT. Thus, there exists a need for a commercially viable circuit and method for controlling the display for both a CRT and flat panel display device in a processing system.

Prior art patents known to applicants neither teach or suggest a solution to the foregoing problems. U.S. Pat. No. 4,338,597 pertains to a method for communicating between a CRT and its controller over long distances. U.S. Pat. No. 4,739,313 describes a method and circuit for using a composite video input to generate a plurality of video outputs. U.S. Pat. No. 4,563,676 discloses a circuit for generating a composite video signal. U.S. Pat. No. 4,626,837 describes a technique for superimposing video information. British Patent No. 2085257 involves a text mode display. The size of display characters is controlled by changing the frequency of the clock while the character is being displayed (horizontally) and by repeating the character line (vertically).

SUMMARY OF THE INVENTION

The invention is useful in a data processing system having a processor, a display device, and a video controller. The video controller receives address, data, and clock information from the processor, interacts with a memory, and generates video output for display by the display device.

In a broad aspect, the invention comprises a controller that includes a plurality of main circuits, alternate circuits, select circuits, and a circuit for identifying the display device used in the system.

Each main circuit receives information from the processor and generates main video information. Each alternate circuit receives information from the processor and generates alternate video information. The identifying circuit receives information from the display device or the processor and generates display identification information.

Each select circuit receives main video information from a main circuit and alternate video function information from a corresponding alternate circuit. Each select circuit provides the main video information as output when the display is a main display such as a CRT and the alternate video information as output when the display device is an alternate display such as a flat panel.

In one embodiment of the invention, at least one alternate circuit comprises a register. In one embodiment of the invention, at least one alternate circuit is programmable. In another embodiment of the invention, at least one alternate circuit is programmable by the processor during system powerup. In various embodiments, the video functions that are selected include the following: horizontal display size, vertical display size, blanking, blink rate, and sync functions.

In another embodiment, the invention also includes a plurality of tables, each having a program corresponding to a possible display device. A decoder decodes the device identification information and enables a table corresponding to the identified device. The enabled table programs the alternate registers to provide video functions compatible with the identified device.

Other features and advantages of the invention will become apparent by reference to the brief description of the drawings, the detailed description, and the claims.

BRIEF DESCRIPTION OF THE DRAWINGS

FIG. 1 is a data processing system according to one embodiment of the invention;

FIGS. 2A and 2B show an array of main circuits, alternate circuits, and select circuits according to embodiments of the invention;

FIG. 3 is a block diagram of a controller subsystem for generating timing signals according to one embodiment the invention; and FIGS. 4 and 5 are block diagrams of various embodiments of the invention.

DETAILED DESCRIPTION OF THE DRAWINGS

The invention will now be explained first by reference to the operation of a controller in a data processing system as shown in FIG. 1. The invention will be further explained by reference to the operation of main registers and alternate registers according to the embodiment of the invention shown in FIG. 2. The invention will be further explained by reference to a circuit for selecting timing signals for a flat panel and CRT as shown in FIG. 3. The invention will then be explained by reference to the operation of tables which program alternate registers to provide video functions for a plurality of alternative display devices as shown in FIG. 4. Finally, the invention will be explained by reference to the use of a select logic circuit as shown in FIG. 5.

FIG. 1 shows components commonly used in a typical personal computing system. The system 2 has a central processor 10, a video graphics controller 12, and a video display device 14. Processor 10 provides address, data, clock and other video control information to a plurality of main registers 20, alternate registers 30, and to a memory (not shown). The registers 20, 30 control controller hardware 50.

It is known in the prior art to use a plurality of registers for main registers 20 to cause hardware 50 to provide a host of video functions. The following registers have been used in prior art video graphics controllers made by applicants' assignee:

- address registers;
- horizontal total registers;
- horizontal display enable end registers;
- start horizontal blanking registers;
- end horizontal blanking registers;
- start horizontal sync registers;
- end horizontal sync registers;
- vertical photo registers;
- CRT controller overflow registers;
- preset roll scan registers;
- maximum scan line registers;
- cursor start scan line registers;
- cursor end scan line registers;
- start address high registers;
- start address low registers;
- cursor location high registers;
- cursor location low registers;
- vertical sync start registers;
- light pin high registers;
- light pin low registers;
- vertical sync end registers;
- vertical display enable end registers;
- offset registers;
- underline location registers;
- start vertical blanking registers;
- end vertical blanking registers;
- CRT mode control registers;
- line compare registers;
- graphics address registers;
- set/reset registers;
- enable said reset registers;
- color compare registers;
- data rotate registers;
- read map select registers;
- graphics mode registers;
- color don't care registers;
- bit mask registers;
- feature control registers;
- input status registers;
- seek point registers;
- character font select registers;
- color registers;
- pixel panning registers;
- pixel padding registers;
- global control registers;
- general purpose output registers;
- video interface registers;
- emulation mode registers;
- light registers; and
- other miscellaneous registers.

Each of the foregoing registers may be included as a main register in controller 12 to generate video control information that is provided to a corresponding video hardware circuit 50 in controller 12.

The term "register" as used herein primarily refers to the conventional registers used in a conventional video controller. In a broader sense however, "register" is used to refer to any conventional digital circuit which receives and outputs digital bits. The term "register" should also be understood to apply to discrete physical registers which output a plurality of bits which are processed essentially as one word. Thus, it should be understood that the term "register" is not strictly limited by the physical proximity of bit handling circuits but is directed to the logical relationship between bit handling circuits.

The hardware 50 in controller 12 could be conventional circuits for performing the previously mentioned video control functions. Each hardware circuit 50 generates video information that is provided to display 14 either directly or through a data handler circuit (not shown) as is generally known in the art.

Referring still to FIG. 1, according to the invention, controller 12 includes alternate registers (represented by alternate register 30), a display type register 31, and select circuits (represented by select circuit 40).

Alternate registers 30 receive video information from main registers 20 or, alternatively from processor 10, and output alternate video control information to select circuit 40. Main video control information from main registers 20 is also provided to select circuit 40. Alternate registers 30 may perform the same, or substantially the same, functions as the main registers 20 listed above but will cause generation of different video control information to match the different characteristics of the alternate display in use. Each alternate register 30 may be a conventional register as each main register 20.

Typical functions for which alternate registers have been employed by applicants' assignee include the following:

- alternate horizontal total;
- alternate horizontal display enable end;
- alternate horizontal blanking start;
- alternate horizontal blanking end;
- alternate horizontal sync start;
- alternate horizontal sync end;
- alternate offset;
- alternate vertical total;
- alternate overflow;
- alternate vertical sync start;
- alternate vertical sync end; and
- alternate vertical display enable end.

In one embodiment, alternate registers 30 are programmed by processor 10 when processing system 2 is powered up. Processor 10 programs alternate registers 30 depending on the identity of display device 14. Registers 30 are programmed such that the video control information output from each register will cause the video display to be compatible with the alternate display device 14. In a simple case, the alternate registers can be generically programmed to generate the same video control information wherever a standard flat panel display is used. In a more elaborate embodiment, processor 10 can include application software such that the alternate registers are programmable to provide compatibility for a number of identifiable display types or display modes.

During normal processing, processor 10 provides address, data, and other information to the alternate registers in parallel with the main registers. The alternate registers output alternate video information to select circuit 40. Select circuit 40 receives main video information from main registers 20 and an identification signal identifying the display device from a display type register 31 in alternate registers 30. Select circuit 40 will provide main video information as output when the display device is a main preferred display such as a CRT display device. However, when the display device is an alternate display device such as a flat panel display, select circuit 40 will provide as output alternate video control information generated by the alternate registers 30. The selected video control information will be provided as input to hardware circuits 50, and thereafter processed as in a conventional controller.

In operation, central processing unit 10 will program alternate registers 30 during system powerup. During actual processing, processing unit 10 will be totally unaware of the existence of the alternate registers and will continue to interface with the main registers. According to the invention, however, alternate registers 30 and select circuit 40 will generate video control information compatible with an alternate display device.

It can be seen that the problem of substantially redesigning a processor that is designed to drive a CRT display so that the processor can be used to drive a flat panel display has been resolved. According to the invention, the processor can now drive a plurality of display devices with minimal changes to the processor hardware. The processor's application software will continue as if it is in communication only with the main registers; however, the alternate registers will provide actual control of the controller hardware. According to the invention, alternate registers and a select circuit have been added to resolve the need for generating video control information compatible with a flat panel display without modifying normal processing in the processor or the other controller circuitry for the CRT.

Although the alternate registers and the select circuit have been described as being programmed based on information identifying the display device, it should be understood that the registers and the select circuit can be programmed and made responsive to other desirable information. For example, the identification information could identify a current display mode defined by certain graphics, horizontal display size, vertical display size, and font characteristics. According to the various embodiments of the invention, the processor will program the alternate registers to provide video control information compatible with a very specific display device in a particular display mode.

FIG. 2A shows a main register array 20 and an alternate register array 30 that feed an array 40 of select circuits for generating sync information for both a CRT and flat panel display. Main register array 20 includes among its many registers a CRT horizontal sync register 24 and a CRT vertical sync register 26.

Alternate register array 30 includes registers having functions corresponding to the functions of the registers in main register array 20. As an example, alternate register array 30 includes a flat panel horizontal sync register 34 and a flat panel vertical sync register 36.

The video control information from CRT horizontal sync register 24 (main video information) and flat panel horizontal sync register 34 (alternate video information) are fed into a select circuit 42. Likewise, video control information from CRT vertical sync register 26 and flat panel vertical sync register 36 are fed into a select circuit 46. Select circuits 44 and 48 receive main video information and alternate video information from registers 28 and 38, and 29 and 39, respectively.

Each select circuit in select circuit array 40 will provide the main video information as output when a preferred, main display type such as a CRT is used with the processor. However, when a flat panel display is identified as being used with the processor, the select circuits will provide as output the alternate video information.

The video information output of each select circuit is provided to controller hardware circuitry to control specific video display functions. For example, the horizontal sync signal selected by select circuit 42 is provided to a horizontal sync circuit 54. Likewise, the vertical sync information selected by select circuit 46 is provide to a vertical sync circuit 56. The video information selected by each of select circuits 44 and 48 is likewise provided to their counterpart hardware circuits.

FIG. 2B is a more sophisticated circuit diagram showing the relationship between main registers 20, alternate registers 30, select circuits 40A and 40B, and hardware 50 according to another embodiment of the invention. FIG. 2B emphasizes that main registers 20 will typically interact with the alternate registers and the hardware in three different ways according to the invention. First, some of the main registers 20, represented by registers 21, will always interface with the controller hardware 50 regardless of whether the display is a CRT or a flat panel display. For example, a graphics controller register will always provide control information to its hardware whether the display is a CRT or a flat panel display. In addition, other main registers, represented by main registers 23, will be used when the display is a CRT display but will not be used when the display is a flat panel display. As an example, a horizontal sync register in registers 20 will be used in a CRT mode but will not be used in a flat panel mode. The horizontal sync information will then be obtained from horizontal sync register and alternate registers 30. Finally, some registers, represented by registers 25 in main registers 20, are used in both the CRT mode and in the flat panel mode. The contents of registers 25 are used in the flat panel mode to generate a control signal that is used for selecting between the contents of various alternate registers. As an example of this use of main registers 25, refer again to FIG. 2B. As shown therein, registers 25 provide an output to a decoder 39. Decoder 39 provides a control signal output that is used as a select signal input to an alternate select circuit 40B. The inputs to alternate select circuit 40B are the contents of alternate registers 33A, 33B and 33C. In response to the control (select) signal from decoder 39, alternate select circuit 40B selects alternate video information from alternate register 30, and the selected alternate information is provided to select circuit 40A. Select circuit 40A is representative of the select circuits used for selecting between the contents of main registers 20 and alternate registers 30. Select circuit 40A is responsive to a select signal from a display type register 31 in the alternate registers 30. In summary then, main registers 25 may be used to provide a control signal for selecting between the contents of a plurality of alternate registers.

FIG. 3 shows a circuit for generating alternate timing signals according to one embodiment of the invention. As shown in FIG. 3, a 25 megahertz clock 62 and a 28 megahertz clock 64 each provide a clock signal to a select circuit 68. To provide compatibility with a flat panel display, a 22 megahertz clock 66 also provides a clock input to select circuit 68. It should be understood that any alternate frequency (clock) other than 22 MHz required by a flat panel can be provided within the spirit of the invention.

Select circuit 68 selects one of the three clock input signals in response to information provided from a select circuit 76. Select circuit 76 is in turn fed the output from a main clock register 72 and an alternate clock register 74. Select circuit 76 will output main clock information when an identification signal received by select circuit 76 indicates the display device is a CRT. Likewise, select circuit 76 will output alternate clock information when the identification signal indicates the display device is a flat panel display.

Select circuit 68 will select the clock information from CRT clock circuit 62 or 64 when the select circuit 76 outputs main clock information. Likewise, select circuit 68 will output the 22 megahertz clock when the select circuit 76 outputs alternate clock information.

FIG. 4 shows a data processing system 2 that includes an array of tables 90 for programming alternate registers 30 and a decoder 100 for enabling table array 90. Decoder 100 receives identification information that identifies a current display mode or a current display device 14A used in processing system 2. Decoder 100 decodes the identification information and provides an output to one of the tables in table array 90.

Table array 90 includes a plurality of tables 92, 94, 96, 98, and 99, etc. Each table programs alternate registers 30 differently depending on the identity of display device 14A or the display mode. For example, if display 14A were a flat panel display having specific font, vertical, horizontal, and text or graphic features, table A will be configured to program alternate registers 30 so that video control information will be provided to the controller hardware compatible with the display mode.

Tables 90 may be included in the controller circuitry and could, upon receiving the identification information, program alternate registers 30 during system powerup. Thereafter, alternate registers 30 would provide alternate video control information to select circuits 40 as has been previously discussed.

FIG. 5 shows yet another embodiment of the invention. This embodiment is distinguished by the use of a select control logic circuit 41 for generating a select signal for select circuit 40. Select control circuit 41 receives mode bits from main registers 20 and display type information from display type register 31 and alternate registers 30. The mode bits indicate the desired mode for the display, such as texts or graphics mode, number of lines, color or monochrome, and similar information. The select control logic circuit receives the mode bits and display type information and generates select control signals that are provided to the select circuits represented by select circuit 40.

Although the invention has been explained with reference to the foregoing embodiments, it should be understood that numerous changes, variations and modifications may be made to the foregoing within the scope of the invention.

For example, alternate registers have been used according to various embodiments in parallel with the main registers used in some conventional controllers. It should be understood, however, that where other circuits (than registers) are used in a controller to generate video control information, similar alternate circuitry may be employed according to the invention. For these non-register applications, the video control information from the main circuit and alternate circuits would be provided to a select circuit that would output the appropriate information depending on the identity of the display device to be used in the system.

Moreover, although the invention has been primarily explained by reference to alternate registers that are used with flat panel displays, it should be understood that the alternate registers can be programmed for a specific flat panel or CRT display device.

Any number of conventional select circuit configurations can be used, and it should be understood that a "select circuit", as used herein, refers to a digital circuit or circuits that selects between a plurality of inputs in response to identifiable control signals.

It should also be understood that the circuit diagrams herein are illustrative only and that circuits designed using state of the art computer assisted design techniques might look very different from the disclosed circuits without at all escaping the scope, spirit, and function of the invention and the embodiments disclosed herein.

Thus, it should be understood that the invention is to be limited only in accordance with the appended claims.

What is claimed is:

1. In a data processing system capable of operating in a plurality of predefined display modes, the system having a processor, a video display device of a type that is one of a plurality of types of video display devices, a memory for storing video display information, and a video controller for receiving input from the processor and for interacting with said memory to provide video information to the display device, a controller comprising:

a plurality of main circuits corresponding to the plurality of display modes, each capable of storing main video information for a first type of display device, each of the main circuits generating main video information for a respective one of the plurality of display modes;

a plurality of alternate circuits, each alternate circuit capable of storing alternate video information for a second type of video display device, each of the alternate circuits storing alternate video information for a respective one of the plurality of display modes, the alternate video information being stored only when the value of the main video information is different in value from the alternate video information;

a plurality of select circuit means, said plurality of select circuit means for receiving main video information when a first type of display means is operational, and receiving main video information and alternate video information when a display device of a second type is operational;

means for receiving an identification signal from the video display device, which signal indicates to the controller which of the plurality of types of video display devices is coupled to the controller, each of said select circuit means being responsive to the identification signal, said select circuit means providing main video information to the video display device when the first type of display device is coupled to the processor and providing main video information and alternate video information when the second type of display device is coupled to the controller, the alternate video information only being provided when the value of the main video information is different from the value of the alternate video information differs from said main video information;

a plurality of programming tables, each corresponding to a display device; and means for decoding the identification signal from the video display device to enable the one of said programming tables which corresponds to the identified video display device, said programming tables providing alternate video function information to the alternate registers during system initialization, said alternate video function information differing from said main video function information in at least those registers required for the selected display mode.

2. The controller of claim 1 and wherein at least one of said alternate circuits is programmable.

3. The controller of claim 1 and wherein at least one of said alternate circuits is programmed by said processor during powerup of said system.

4. The controller of claim 1 and wherein said video information includes at least one of the following: horizontal line size, vertical line size, blinking, blink rate, sync functions, and clock functions.

5. The controller of claim 1 and wherein at least one of said main circuits comprises a register.

6. The controller of claim 1 and wherein at least one of said alternate circuits comprises a register.

7. The controller of claim 1 wherein the first predetermined video display device is a cathode ray tube ("CRT") and the second predetermined video display device is a flat plane display.

8. The controller of claim 7 wherein said means for receiving an identification signal from said display device to generate display identification information comprises a plurality of main registers coupled to said processor for receiving an input from said processor and for generating main video information for the first video display device, said main video information enabling the video display device to operate in one of the predefined display modes;

alternate registers coupled to said processor for receiving an input from said processor and for generating alternate video information for the second video display device, the contents of said alternate registers differing from the contents of the main registers and enabling the second video display device to display video information in the same predefined display mode as the main registers; and select circuit means coupled to said main and said alternate registers and responsive to information from said processor identifying said display device to generate said display identification information, said display identification information comprising said main video function information when said display device is said first display device and said identification information comprising said alternate video function information when said alternate video information for the predefined display modes differs from said main video function information.

9. The controller of claim 1 wherein at least one of said alternate circuits is programmed by said processor during a reset operation for resetting system parameters.

* * * * *